INVENTORS.
LOUIS C. THAYER
MICHAEL CZUHA, JR.
BY THEIR ATTORNEYS.
HARRIS, KIECH, FOSTER & HARRIS

Aug. 25, 1959     L. C. THAYER ET AL     2,901,327
METHOD FOR MEASURING TRACES OF DISSOLVED OXYGEN
Filed May 23, 1955     2 Sheets-Sheet 2
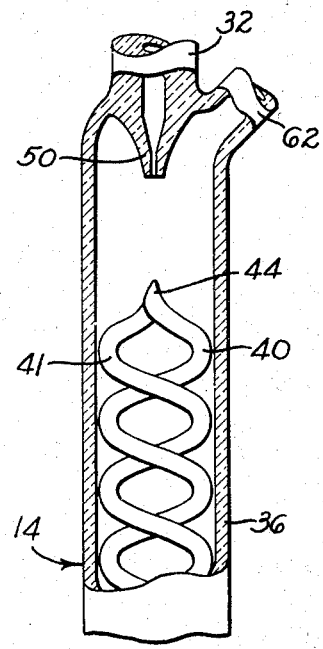
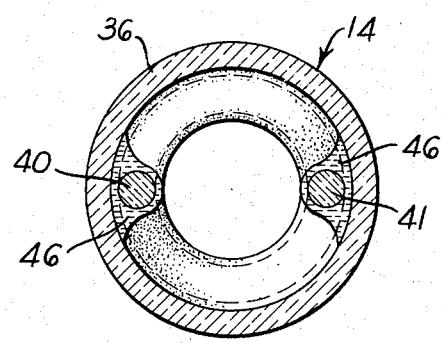
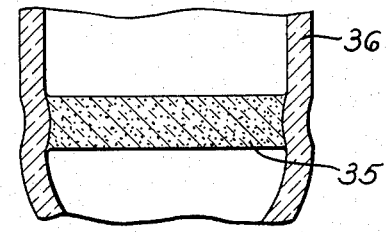
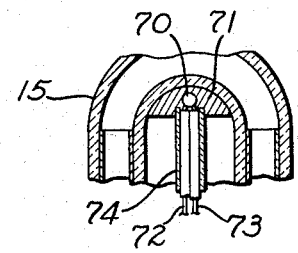
INVENTORS.
LOUIS C. THAYER
MICHAEL CZUHA, JR.
BY THEIR ATTORNEYS.
HARRIS, KIECH, FOSTER & HARRIS United States Patent Office 2,901,327
Patented Aug. 25, 1959

2,901,327
METHOD FOR MEASURING TRACES OF DISSOLVED OXYGEN

Louis C. Thayer, Duarte, and Michael Czuha, Jr., Temple City, Calif., assignors, by mesne assignments, to Beckman Instruments, Inc., Fullerton, Calif., a corporation of California Application May 23, 1955, Serial No. 510,491

11 Claims. (Cl. 23—230)

The present invention relates to a new and improved method for the analysis of water for dissolved oxygen.

The advent of modern high-pressure boilers has necessitated a great deal of emphasis on the reduction of dissolved oxygen within boiler feed-water as a preventative measure in minimizing corrosion. A number of processes have been developed in the past based upon either purely physical or purely chemical methods for determining the quantity of dissolved oxygen within water such as boiler feed-water. Perhaps the most common of these prior methods is based upon the oxidation of a manganous hydroxide suspension. Various refinements of this method, such as the use of potentiometric deadstop indicators, have brought it to a relatively high degree of refinement, but, nevertheless, the method is inherently inapplicable to continuous analysis of water at a rapid rate. Various thermal conductivity methods using reference gases have also been developed.

It is considered that none of these prior methods completely meets the need in the industry for an efficient, compact, relatively easily operated, continuous method to accomplish the purpose intended. It is an object of the present invention to provide a new and improved method which is, relatively inexpensive, and exceedingly efficient for the continuous analysis of water for dissolved oxygen. A related object of the invention is to provide a new and improved process for the analysis of water for dissolved oxygen when is very simple to carry out and which is exceedingly effective over a wide range of temperatures. Further objects of this invention and many advantages thereof will be made apparent hereinafter.

The invention may be summarized as being concerned with a method in which certain ionic ingredients are initially removed from the water, the water then being passed through a conductivity cell where its conductivity is measured. Next the water is treated with nitric oxide, which is oxidized by the dissolved oxygen in the water to produce nitrous acid. Thereafter, the conductivity of the water is again measured, the differential between the two conductivity measurements being an indication of the dissolved oxygen content of the initial water. While the process of the invention may be carried out using a wide variety of types of equipment, the precise apparatus herein specified is considered to be particularly suitable because of its effectiveness and comparatively small size.

Perhaps the invention may best be explained with reference to the accompanying drawings, in which is shown an apparatus used for the method in accordance with the invention to measure the dissolved oxygen in water.

In the drawings:

Fig. 2 is an enlarged view of a portion of Fig. 1 indicated by the arrow 2;

Fig. 3 is an enlarged sectional view taken along the lines 3—3 of Fig. 1;

Fig. 4 is an enlarged view of a portion of Fig. 1 indicated by the arrow 4; and

Fig. 5 is an enlarged view of a portion of Fig. 1 indicated by the arrow 5.

Figure 1:
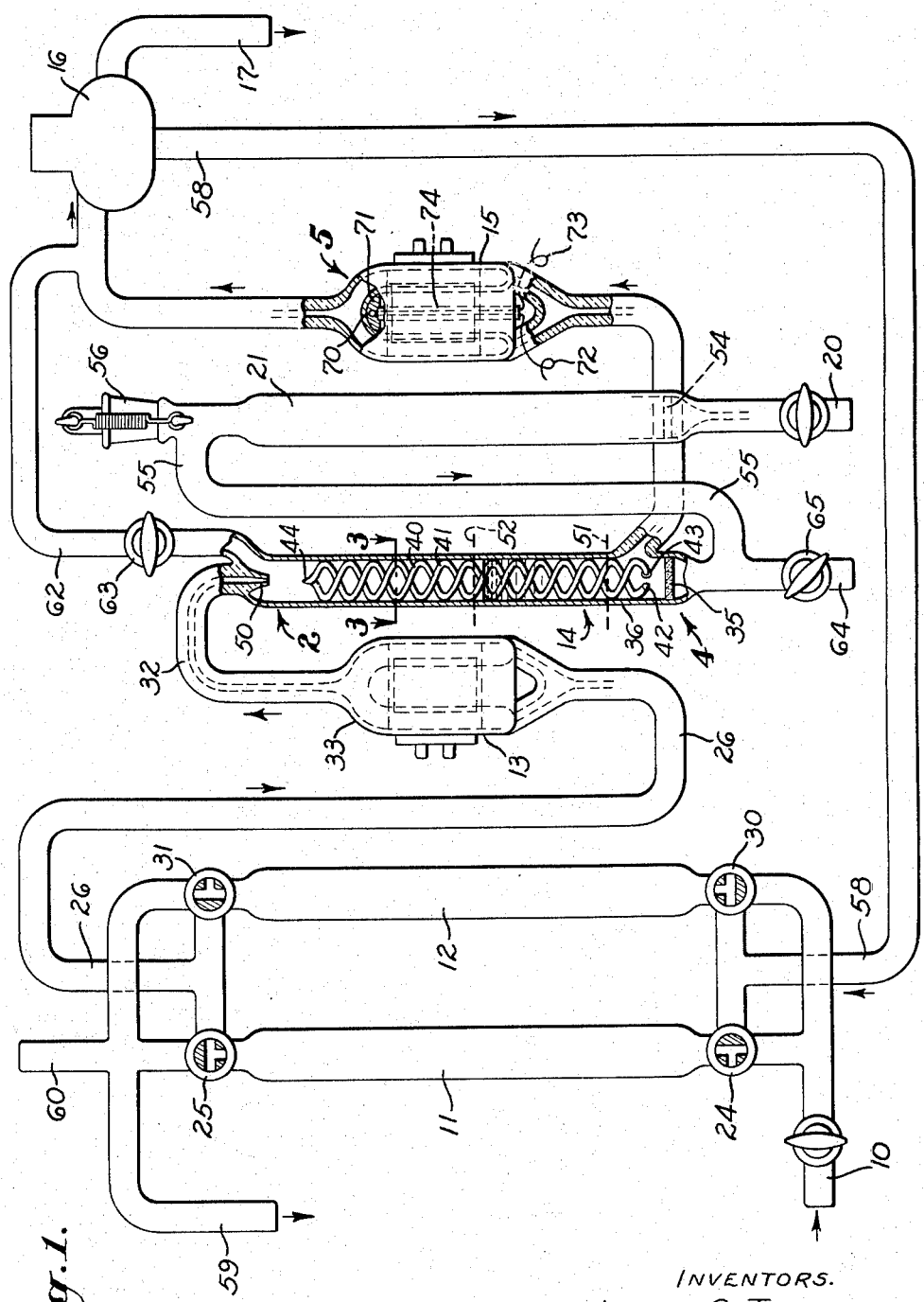
Fig. 1 is a view of a preferred embodiment used for the method of the invention shown partly in section.

The water to be analyzed for dissolved oxygen content is fed into the apparatus of Fig. 1 through an inlet pipe 10. The water is then directed through ion exchange materials contained in ion exchange columns 11 and 12, upward through a first conductivity cell 13, downward through a contacting chamber 14, upward through a second conductivity cell 15, and then through an aerating reservoir 16 to a waste outlet 17. A suitable reaction gas is fed into the apparatus through an inlet pipe 20 and a scrubbing tower 21, and is then bubbled into the contacting chamber 14.

In the operation of the invention, it is only necessary for the inlet water to pass through one of the ion exchange columns 11, 12, the other exchange column being regenerated while the first column is in use. In Fig. 1, valves 24, 25, located respectively at the inlet and outlet of the column 11, are illustrated as positioned so that water from the inlet pipe 10 will flow through the column 11 and then through a connecting pipe 26 into the first conductivity cell 13.

The purpose of the ion exchange material is to remove various cations, such as magnesium and calcium, weakly acid anions such as carbonate, bicarbonate, sulfite and phosphate, and ammonia and amines present in the inlet water. This may be accomplished by several methods, such as the use of a mixed bed ion exchange resin or the use of serially connected ion exchange columns, each having a single ion exchange material therein. However, it is preferred in the practice of the invention to utilize a single ion exchange column having the water flowing upward therethrough and operated as a consecutive bed ion exchange. It has been found that the use of consecutive beds in the ion exchange system improves the performance of the overall analysis by a factor of two or three as compared to mixed bed systems. The use of a single ion exchange column rather than a plurality of serially connected columns permits a more compact, rugged and inexpensive apparatus.

The lower part of the column is filled with a cation exchange material which may be a sulfonated polystyrene resin operating in the hydrogen cycle. In this portion of the column, cations, such as sodium, calcium and substituted ammonium ions, are replaced by hydrogen ions. Some ion exchange materials particularly suitable for this use are resins currently known by the tradenames Dowex 50-X8, Amberlite IR 120 and Permutit Q. The upper portion of the column contains an anion exchange material such as a quaternary amine resin operating in the nitrite cycle. Dissolved material contained in the water leaving the cation exchange section consists of various acids, such as carbonic, phosphoric, sulphurous, sulphuric, and hydrochloric. These acid anions are replaced by nitrite from the anion exchange material so that the water leaving the column contains a dilute solution of nitrous acid, which, in the concentration present, is almost completely ionized. Some suitable anion exchange materials for this purpose are resins currently known by the trade-names Dowex 2–X8, Amberlite IRA 400 and Permutit S–1.

The ion exchange materials do not completely fill the column and, the anion exchange materials utilized being less dense than the cation exchange materials, the upward flow of water in the column tends to keep the two exchange materials separated into strata.

The removal of ions of the categories described is important inasmuch as the present invention operates by virtue of a change in the conductance of the water occurring through the formation of an acidic compound. If the conductance is plotted against the pH of the solution, a generally U-shaped curve is obtained in which the inflection point occurs at a pH of 7. The conductance of the liquid increases on both sides of this inflection point. It is desirable with the invention to carry out the reaction employed so that all of the conductance measurements taken occur on either an ascending or descending slope of such a conductance-pH curve in order that the conductance measurements are not ambiguous. The use of both an anion and a cation exchange resin, as indicated in the preceding, is very desirable from a technical sense inasmuch as it tends to adjust the pH of the entering water to about 6.

Another advantage of this ion exchange lies in the fact that the conductivity of the liquid leaving the exchange columns may be considerably reduced, compared to that of the water entering the apparatus at the inlet pipe 10. Since the ultimate result of the analysis is based on the difference in the conductivities measured in the cells 13 and 15, it is desirable that the initial or background conductivity of the fluid be at a minimum. The use of consecutive beds in the ion exchange system reduces this background conductivity far greater than does the use of mixed bed systems.

Un-ionized weak acids, such as those contained in the untreated water, tend to buffer acids subsequently formed in the contacting chamber of the apparatus, and thus to introduce errors in the oxygen content analysis. Such reaction would seriously affect the accuracy of measurements at oxygen concentrations of less than 20 parts per billion. Hence the initial ion removal step of the invention provides a more accurate analysis.

The second ion exchange column 12 is identical in construction and operation to the first column 11, having inlet and outlet valves 30 and 31, respectively, for connecting the column between the inlet pipe 10 and the connecting pipe 26 when the first column 11 is being regenerated.

After the initial water has been passed through the ion exchange materials, it is then passed upward through the first conductivity or conductance-measuring cell 13 where the conductivity of this fluid is initially measured. The conductivity cell employed can be of virtually any continuously operating type. A particularly suitable conductivity cell is shown in the copending application Serial No. 500,640, entitled "Measuring Cell," filed April 11, 1955, by Louis C. Thayer. The outlet end of the conductivity cell 13 is coupled to the upper end of the reaction chamber 14 by a capillary tubing 32.

It is preferred that the conductivity cell have a dome-shaped outlet end 33 with the cell oriented so that the liquid passes upward through this cell. With this form of construction, any air bubbles which might enter the cell will rise and be guided into the capillary tubing 32 leading to the contacting chamber. The capillary tubing is utilized so that the bubbles of air are trapped and carried along with the liquid stream and not left at the highest point in the tubing 32 to be slowly absorbed into the liquid. In the practice of the invention, it has been found that a two millimeter internal diameter for the capillary tubing is satisfactory for this purpose.

Water containing the dissolved oxygen and the dilute solution of nitrous acid is then passed through the contacting chamber 14 where it is exposed to a material which reacts with the oxygen. In this embodiment of the invention, nitric oxide gas is utilized, being oxidized by the oxygen to form nitrous acid. The nitric oxide gas is injected under pressure into the bottom of the contacting chamber 14 through a diffuser 35. The accuracy of the measurements made by the apparatus is necessarily dependent upon the requirement that all of the oxygen present in the water be removed by the above reaction.

The present invention employs certain unique constructions and methods of operation which provide for intimate contact of the nitric oxide gas with the dissolved oxygen. The diffuser 35, which is shown in greater detail in Fig. 4, is preferably of such nature that the gas supplied is completely broken up into very finely dispersed bubbles of substantially uniform diameter. Particularly satisfactory results have been obtained by breaking the inlet gas into bubbles of about 0.25 millimeter diameter, utilizing a porous, sintered glass diffusing element which is fused to the wall 36 of the contacting chamber 14.

Various packing materials, such as Berl saddles or glass beads, can be employed to provide large contact areas for the gas and water. However, it has been found that the unique helix construction illustrated in this embodiment provides the contact of the gas and water necessary for the reaction to be complete in a much smaller space than if conventional packing materials were utilized.

In the embodiment illustrated in Fig. 1 and in greater detail in Fig. 2, two intertwined glass helixes 40, 41 of the same pitch are positioned within the chamber 14 in contact with or close proximity to the wall 36. The lower ends of the helixes are fused to the walls at the points 42, 43 and the upper ends of the helixes are preferably joined together, forming a central conical point 44. Liquid impinging on the helix is guided along it and contacts the wall of the contacting chamber. Any downwardly moving stream pierced by the point 44 of the helix is guided outwardly from the center by the upper ends of the helixes and into contact with the wall. The surface tension of the liquid is such that the material flows in a solid sheath 46 (Fig. 3) around the helix and follows a spiral path down the column, being in intimate contact with the gas therein.

Water wets both the helixes and the wall but the helix angle is such that water does not break loose from the helix and flow down the wall from one turn of the helix to the next. This action of the water causes a large surface to be exposed to contact with the gas and permits the liquid to stay in contact with the gas phase for an extended period of time. It is preferred that the helix angle be as flat as possible, the limiting value being reached when the water runs down the side of the vessel rather than around the spiral.

Another important advantage of the helical packing is the prevention of channeling. When liquid flows through a packing in the form of beads or saddles, it may flow along certain selected paths with such rapidity that reaction with the gas phase is not accomplished. A further advantage of this construction is the low volume of liquid holdup coupled with a very high absorption efficiency.

The liquid passes from the connecting pipe 32 into the contacting chamber 14 through a restricted orifice or jet 50, shown best in Fig. 2. The dimensions of this jet are chosen to provide a visual measurement of the flow rate of the liquid into the chamber. At flow rates smaller than the desired rate, the liquid falls from the jet dropwise. When the flow is approximately the desired rate, the liquid leaves the jet in a smooth stream, impinging upon and pierced by the point 44 of the helixes. When the flow rate increases to an excessive amount, a splashing action commences and standing waves created in the liquid are visible in the flow from the jet.

It is preferable in the operation of the embodiment illustrated in Fig. 1 that the liquid level in the contacting chamber 14 be maintained between the lines 51 and 52 respectively corresponding to approximately ⅙ and ½ the height of the contacting chamber. The unique design of the contacting chamber provides continuous regulation of the water level between these limits after the rate of flow of the inlet water and the pressure of the nitric oxide gas have been roughly adjusted. This regulating effect also compensates for variations in the rate of flow of the liquid and of the gas. A lowering of the liquid level corresponds to an increase in the gas flow rate or a decrease in the liquid flow rate and exposes a longer length of helix, and therefore exposes more of the liquid to the gas, resulting in more gas being carried out of the contacting chamber with the liquid. Correspondingly, if the gas flow rate decreases or the rate of flow of liquid increases, the liquid level will rise, providing a shorter contact path between the liquid and the gas. Then, less gas would be carried off with the sample and the rise in liquid level would be reversed.

Commercial nitric oxide usually has small amounts of nitrogen dioxide therein. It has been found necessary to remove the nitrogen dioxide prior to injecting the nitric oxide into the contacting chamber. The commercial nitric oxide may be purified by bubbling through a diffuser 54 into the scrubbing column 21 containing a solution which purifies it. A very effective reagent in removing the nitrogen dioxide is a three-normal solution of trisodium phosphate. If desired, indicators may be added to this solution to show when it has been exhausted. The effluent from the scrubbing column is coupled to the bottom end of the contacting chamber through a pipe 55. The diffuser 54 may be similar in construction to the diffuser 35 used in the contacting chamber 14. A spring-loaded plug 56 is provided at the upper end of the diffusing column 21 for purposes of recharging the column.

The water flowing from the contacting chamber is conveyed through the second conductivity cell 15 where its conductivity is again measured. The differential between the conductivity measurements obtained in the two cells is a direct indication as to the quantity of nitrous acid created in the contacting chamber, and therefore a direct indication of the amount of oxygen removed from the inlet water by the reaction with the nitric oxide. Thus, from the two measurements obtained in the two conductivity cells, the quantity of oxygen may be readily determined by simple calculations. If desired, various electrical circuits may be employed so as to accomplish such calculations, with the result that a continuous meter reading can be obtained indicating the oxygen content of the water flowing through the complete apparatus. Particularly suitable circuits are shown in the copending application Serial No. 495,681, entitled "Method and Apparatus for Measurement of Fluid Conductivity," filed March 21, 1955, by Louis C. Thayer and Malbone W. Greene.

The water flowing from the second conductivity cell 15 is ordinarily of no further value and may be conveyed to waste. However, it has been found desirable in the present embodiment to utilize this waste water in regenerating the ion exchange materials in the columns 11 and 12. The water from the conductivity cell 15 is piped to the aerating reservoir 16 where it is allowed to come in contact with air, permitting the oxygen in the air to react with the excess nitric oxide contained in the liquid, converting it to nitrous acid by the same reaction that takes place in the contacting chamber.

This liquid containing the nitrous acid is conveyed back to the inlet valves 24 and 30 of the ion exchange columns 11 and 12 through the pipe 58, any excess liquid being disposed of through the pipe 17. After passing through one of the exchange columns, e.g., the column 12 with the valves set as in Fig. 1, the spent regenerating liquid is passed to waste through a pipe 59, a vertical pipe 60 serving as a vent for the apparatus.

A line 62 couples the upper end of the contacting chamber 14 with the reservoir 16, the line being normally closed by a valve 63. The lower end of the contacting chamber is coupled to the outside air through a line 64 and valve 65, this valve also being normally closed. This construction provides a rapid method for making a zero test of the apparatus. Ordinarily, it is necessary to shut off the gas flow and then wait until all the gas contained in the contacting chamber has been carried off by the flowing sample before a zero measurement can be made. By use of the construction above described, this measurement may be made without entailing the long waiting period. The valve 65 is opened to vent the nitric oxide gas in the pipe 55, producing a decrease in pressure and preventing further passage of the gas through the diffuser 35 until the pressure builds up again. The valve 63 is opened, thereby venting all of the gas in the chamber. After both valves have been opened and reclosed, there will be a period during which no gas is present in the contacting chamber and the zero adjustments of the measuring apparatus can be made during this perod. In the embodiment of the invention illustrated in Fig. 1, three to five minutes are ordinarily available for making the adjustments.

A temperature-sensitive element 70 may be mounted in one or both of the conductivity cells. The indication provided by this element may be used as a measure of the temperature of the liquid and it also may be used to provide the temperature compensation referred to in the previously mentioned application No. 495,681 relating to the electrical calculating circuits. A preferred embodiment of this construction is shown in detail in Fig. 5, wherein the upper end of the temperature-sensitive element 70 is imbedded in a resinous material 71, preferably being in direct contact with the wall of the cell. The resinous material 71 supports the element 70 and also provides for heat transfer between the cell wall and the element. Electrical connections are made to the temperature-sensitive element by two leads 72, 73 running through an insulating tube 74 which is also imbedded in the resinous material 71. The temperature-sensitive element 70 may be a thermocouple, a thermistor, or the like. This type of construction provides for a good transfer of heat between the fluid and the temperature-sensitive element without requiring actual physical contact.

The extreme simplicity of the method of this invention is not to be considered as detracting from the commercial importance of it. In carrying out the process of this disclosure on a commercial scale, measurements can be made of dissolved oxygen in water at least down to 5 parts per billion. This is believed to be considerably in excess of the sensitivity of any of the related procedures presently known for analyzing boiler feed-water for dissolved oxygen. The apparatus and method herein described form a complete unitary device in which the ion exchange columns used serve to remove unwanted materials from the water being treated in accordance with this disclosure. Further, these same ion exchange columns are regenerated utilizing the waste products from the reaction carried forth in accordance with this disclosure. With a closed treatment cycle such as is herein described, there is never any opportunity for oxygen to enter the apparatus during the use thereof, tending to throw off the complete results obtained.

Those skilled in the art will realize that a number of modifications may be made within the scope of this disclosure without departing from the essential teachings of it. All such modifications are to be considered as part of the inventive concept insofar as they are defined by the appended claims.

We claim as our invention:

1. A process for measuring traces of dissolved oxygen in a liquid that per se has very low electrical conductance, which comprises: converting the ions in said liquid to a predetermined species; measuring the conductance of said liquid; reacting nitric oxide with a basic reagent to remove all nitrogen dioxide therefrom; reacting the dissolved oxygen in said liquid with said reacted nitric oxide so as to form acid, with said nitric oxide not being ionizable in said liquid per se while being reactable with said dissolved oxygen to change the conductance of said liquid, with said predetermined ion species not being reactable with said nitric oxide; and measuring the conductance of said liquid so that the oxygen content of said liquid may be determined by the change in conductance thereof.

2. A process for measuring traces of dissolved oxygen in a liquid that per se has very low electrical conductance, which comprises: measuring the conductance of said liquid; reacting nitric oxide with a basic reagent to remove all nitrogen dioxide therefrom; reacting the dissolved oxygen in said liquid with said reacted nitric oxide so as to form acid, with said nitric oxide not being ionizable in said liquid per se while being reactable with said dissolved oxygen to change the conductance of said liquid; and measuring the conductance of said liquid so that the oxygen content of said liquid may be determined by the change in conductance thereof.

3. A process for measuring dissolved oxygen in a liquid that per se has very low electrical conductance, which comprises: passing said liquid through cationic and anionic exchange materials so as to convert ions present within said liquid to predetermined species; reacting nitric oxide with a basic reagent to remove all nitrogen dioxide therefrom; reacting the dissolved oxygen in said liquid with said reacted nitric oxide so as to form acid, with said nitric oxide not being ionizable in said liquid per se while being reactable with said dissolved oxygen to change the conductance of said liquid, with said predetermined ion species not being reactable with said nitric oxide; and measuring the conductance of said liquid, the oxygen content thereof being a function of the conductance measured.

4. A process for measuring dissolved oxygen in a liquid that per se has very low electrical conductance, which comprises: passing said liquid through cationic and anionic exchange materials so as to convert ions present within said liquid to predetermined species; reacting the dissolved oxygen in said liquid with nitric oxide so as to form acid, with said nitric oxide not being ionizable in said liquid per se while being reactable with said dissolved oxygen to change the conductance of said liquid, with said predetermined ion species not being reactable with said nitric oxide; and measuring the conductance of said liquid, the oxygen content thereof being a function of the conductance measured.

5. A process for measuring traces of oxygen dissolved in water with said dissolved oxygen being substantially un-ionized in said water, the process comprising the steps of: converting ionic impurities present in said water to predetermined ionic species; measuring the conductance of said water after said conversion; introducing into said water a reagent comprising nitric oxide which is substantially un-ionizable in said water, said reagent not tending per se to change the pH of said water but being reactive with said dissolved oxygen to produce a product changing the pH of the water in a given direction from neutrality and increasing the conductivity thereof, said impurity ions tending to change the pH in a direction opposite to said given direction whereas said predetermined ions tend to change the pH in said given direction; measuring the conductance of said water after introducing said reagent; and determining the change in conductance of said water, the concentration of the dissolved oxygen being a function of the change in conductance.

6. A process for measuring traces of oxygen dissolved in a water sample, the sample containing ionic impurities of alkaline reaction, the process comprising the steps of: converting said ionic impurities to ions imparting an acid reaction to said water sample; measuring the conductance of said sample after said conversion; introducing an excess of nitric oxide into said sample for reaction with said dissolved oxygen to increase further the acid reaction of said water sample and to increase the conductivity thereof; measuring the conductance of said sample after introducing said nitric oxide; and determining the change in conductance of said sample, the concentration of the dissolved gas in said water being a function of the change in conductance.

7. A process for continuously measuring traces of a dissolved oxygen in a sample stream comprising a liquid medium intrinsically of relatively low electrical conductance, with said sample containing ionic impurities and with said dissolved oxygen per se being un-ionized and nonconductive in said medium, the steps of: pretreating said sample to minimize the ionic impurities thereof and convert residual ions to predetermined ionic species; continuously measuring the electrical conductivity of said sample stream following said conversion; continuously contacting said liquid medium with a gaseous reagent comprising nitric oxide, said reagent per se not ionizing in said medium or affecting the conductivity thereof but reacting with said dissolved oxygen to form an ionic product in said medium increasing the conductivity thereof, said predetermined ionic species being nonreactable with said ionic product; and continuously measuring the conductivity of said sample stream after said contact with said gaseous reagent so that the concentration of the dissolved oxygen may be continuously determined as a function of the difference in conductances.

8. In a continuous process for measuring traces of dissolved oxygen in a flowing sample stream comprising a liquid medium intrinsically of relatively low electrical conductance, with the dissolved oxygen being substantially un-ionized in said medium, the steps of: passing the sample stream through cationic and anionic exchange material so as to convert ions present within said sample stream to predetermined species; mixing a stream of nitric oxide with a basic reagent to remove all nitrogen dioxide therefrom; then mixing said stream of nitric oxide with said converted sample stream and reacting the dissolved oxygen with said nitric oxide so as to form acid and increase the conductivity of said sample stream; and simultaneously measuring the conductance of said sample stream after passing through the ion exchange materials and after reaction with the nitric oxide so that the oxygen content may be continuously determined by the difference in conductances thereof.

9. A process for measuring traces of dissolved oxygen in a water sample, with the dissolved gas being substantially un-ionized in the water, the process comprising the steps of: converting impurities present in said sample to predetermined ionic species; measuring the conductance of said sample after said conversion; introducing nitric oxide into said sample, which nitric oxide is not ionizable in water, but which is reactable with oxygen to produce an ionized product increasing the conductivity of said sample, said impurities being reactive with, whereas said predetermined ionic species are nonreactive with, said ionized product; measuring the conductance of said sample after introducing said nitric oxide; and determining the change in conductance of said sample, the concentration of the dissolved gas in said sample being a function of the change in conductance.

10. A process for measuring traces of dissolved oxygen in a water sample, with the dissolved gas being substantially un-ionized in the water, the process comprising the steps of: passing said water sample through ion exchange material for converting impurities present in said sample to predetermined ionic species; measuring the conductance of said sample after said conversion; introducing nitric oxide into said sample, which nitric oxide is not ionizable in water, but which is reactable with oxygen to produce an ionized product increasing the conductivity of said sample, said impurities being reactive with, whereas said predetermined ionic species are nonreactive with, said ionized product; measuring the conductance of said sample after introducing said nitric oxide; determining the change in conductance of said sample, the concentration of the dissolved gas in said sample being a function of the change in conductance; and regenerating said ion exchange material with said water sample containing said ionized product.

11. A process for measuring traces of dissolved oxygen in a water sample, with the dissolved gas being substantially un-ionized in the water, the process comprising the steps of: passing said water sample through ion exchange material for converting impurities present in said sample to predetermined ionic species; measuring the conductance of said sample after said conversion; introducing nitric oxide into said sample, which nitric oxide is not ionizable in water, but which is reactable with oxygen to produce an ionized product increasing the conductivity of said sample, said impurities being reactive with, whereas said predetermined ionic species are nonreactive with, said ionized product; measuring the conductance of said sample after introducing said nitric oxide; determining the change in conductance of said sample, the concentration of the dissolved gas in said sample being a function of the change in conductance; exposing to oxygen said water sample containing said ionized product so as to react any excess nitric oxide in said water sample with the oxygen and form additional ionized product; and regenerating said ion exchange material with said water sample containing said ionized product.

References Cited in the file of this patent

UNITED STATES PATENTS

| | | |
|---|---|---|
| 1,560,660 | Cain | Nov. 10, 1925 |
| 1,919,858 | Pettingill | July 25, 1933 |
| 1,922,666 | Daynes | Aug. 15, 1933 |
| 2,202,346 | King | May 28, 1940 |
| 2,241,121 | Daniels | May 6, 1941 |
| 2,548,187 | Anderson | Apr. 10, 1951 |
| 2,583,891 | Schwarzenbach | Jan. 29, 1952 |
| 2,628,194 | Gilwood | Feb. 10, 1953 |

OTHER REFERENCES

Webb: "Absorption of Nitrous Gases," 1923, pages 115, 119, 331, 332, 336, 341 and 343.

Samuelson: "Ion Exch. in Anal. Chem.," 1953, pages 111, 166, and 259.

Fellows: "Inst. Society of America," vol. 7, 1952, page 23.